United States Patent

Baum et al.

Patent Number: 5,833,528
Date of Patent: Nov. 10, 1998

[54] CAB AIR INLET AND SERVICE ACCESS ARRANGEMENT

[75] Inventors: Dean O. Baum, Fargo, N. Dak.; James A. King; John J. Anderson, both of Moorhead, Minn.; F. Randall Hugh, Fargo, N. Dak.

[73] Assignee: Case Corporation, Racine, Wis.

[21] Appl. No.: 848,991

[22] Filed: May 2, 1997

[51] Int. Cl.⁶ ........................................... B60H 1/26
[52] U.S. Cl. .......................................... 454/151; 454/158
[58] Field of Search .................. 454/84, 95, 143, 454/151, 158, 159, 161

[56] References Cited

U.S. PATENT DOCUMENTS

| | | |
|---|---|---|
| 3,868,896 | 3/1975 | Doll et al. . |
| 4,344,356 | 8/1982 | Casterton et al. . |
| 4,365,541 | 12/1982 | Marques et al. . |
| 4,492,151 | 1/1985 | Mattei . |
| 4,612,975 | 9/1986 | Ikari . |
| 4,648,311 | 3/1987 | Slosiarek et al. ................... 454/158 |
| 4,783,115 | 11/1988 | Galubensky et al. ............ 454/143 X |
| 4,874,036 | 10/1989 | Masuda . |
| 4,989,500 | 2/1991 | Anliker et al. ..................... 454/158 |
| 5,119,718 | 6/1992 | Wagner et al. ..................... 454/158 |
| 5,308,279 | 5/1994 | Grinberg ........................... 454/151 |
| 5,443,208 | 8/1995 | Potter . |

FOREIGN PATENT DOCUMENTS

| | | | |
|---|---|---|---|
| 2 235 283 | 2/1991 | United Kingdom | ............ 454/158 |

*Primary Examiner*—Harold Joyce
*Attorney, Agent, or Firm*—Foley & Lardner

[57] ABSTRACT

An air inlet and service access arrangement for the cab of a work vehicle. A plenum, having a filter mounted therein, is secured to the inside of a louvered door, such that outside air may be drawn through the louvers and the filter, to be supplied to the cab air handling system. By opening the louvered door, the filter may be removed for servicing or replacement, and access is provided to serviceable components of the air handling system and other work vehicle systems located behind the door.

20 Claims, 3 Drawing Sheets

CAB AIR INLET AND SERVICE ACCESS ARRANGEMENT

FIELD OF THE INVENTION

The present invention relates to a system for providing outside air to the air handling system (e.g. heating, ventilating and/or air conditioning system) for the enclosed cab of a work vehicle such as a tractor. More particularly, it relates to an arrangement for providing filtered fresh air to the cab, and access to enclosed electrical and mechanical components of various operating systems of the vehicle, including the air handling system.

BACKGROUND OF THE INVENTION

Cabs have been provided on work vehicles, such as wheel loaders, tractors, and end loaders, which typically operate in dirty atmospheres, so as to provide the vehicle operator with clean air at a predetermined comfortable temperature. It is desirable to construct such cabs as compactly as possible, providing of course adequate room for the comfort of the operator. It is also desirable to design the components of the cab so as to reduce the overall cost of the cab, both with respect to component cost and assembly cost. It is further desirable to construct the cab such that components enclosed therein which require servicing are readily serviceable in an efficient manner.

Accordingly, an air inlet system for the air handling system of a cab of a work vehicle which is of a compact design, is readily serviceable and which provides the additional function of providing access to enclosed electrical and mechanical components of the operating systems of the vehicle is desirable.

SUMMARY OF THE INVENTION

An air inlet system in accordance with the present invention includes a door having ventilation openings therein through which outside air may flow to a plenum secured to the inside surface of the door. The plenum is provided with an opening, through which a filter may be placed in the plenum when the door is open. Another opening in the plenum is aligned with a duct when the door is closed to supply air to the inlet of a blower which supplies air to the cab.

DETAILED DESCRIPTION OF THE PREFERRED EMBODIMENT

Figure 1:
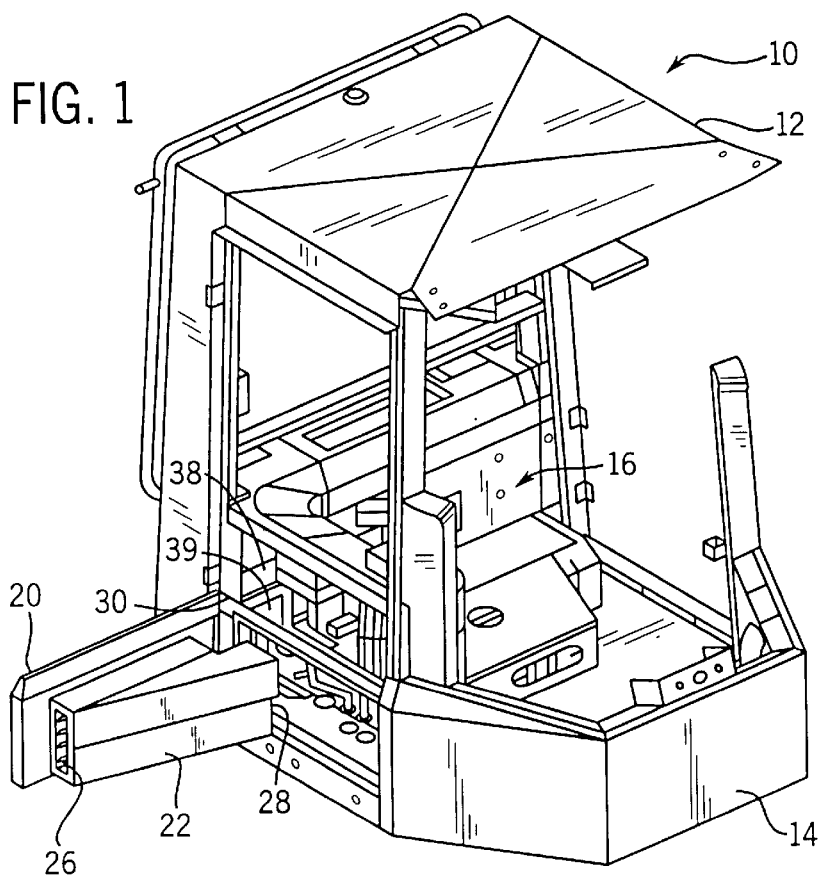
FIG. 1 is a front perspective view of a work vehicle cab, with a portion broken away, showing an air inlet system in accordance with the present invention, with a hinged door in an open position.

Illustrated in FIG. 1 is the cab 10 of a work vehicle such as a tractor, combine or excavator, with certain components omitted, such as windows, doors, the operator's seat as well as inside and outside finishing components. A roof 12 is shown supported on pillars over the rear portion of the cab 10. The base 14 of the front of the cab 10 is shown as three segments. In a completed cab a window would extend between the base 14 and the roof 12. Located behind and under the position which would be occupied by the operator's seat is an air handling and conditioning system 16.

Door 20 is pivotably supported by cab 10 at a hanged end 30. Door 20 is connected to cab 10 at end 30 by a pair of hinges (not shown in detail) and held closed by an appropriate latch. Depending upon the application, each hinge may include a pivot pin which is held within only half of the hinge. This arrangement allows the hinge halves to be separated to permit door 20 to be removed from cab 10 when door 20 is open. This provides less restricted access into the opening covered by door 20.

Figure 2:
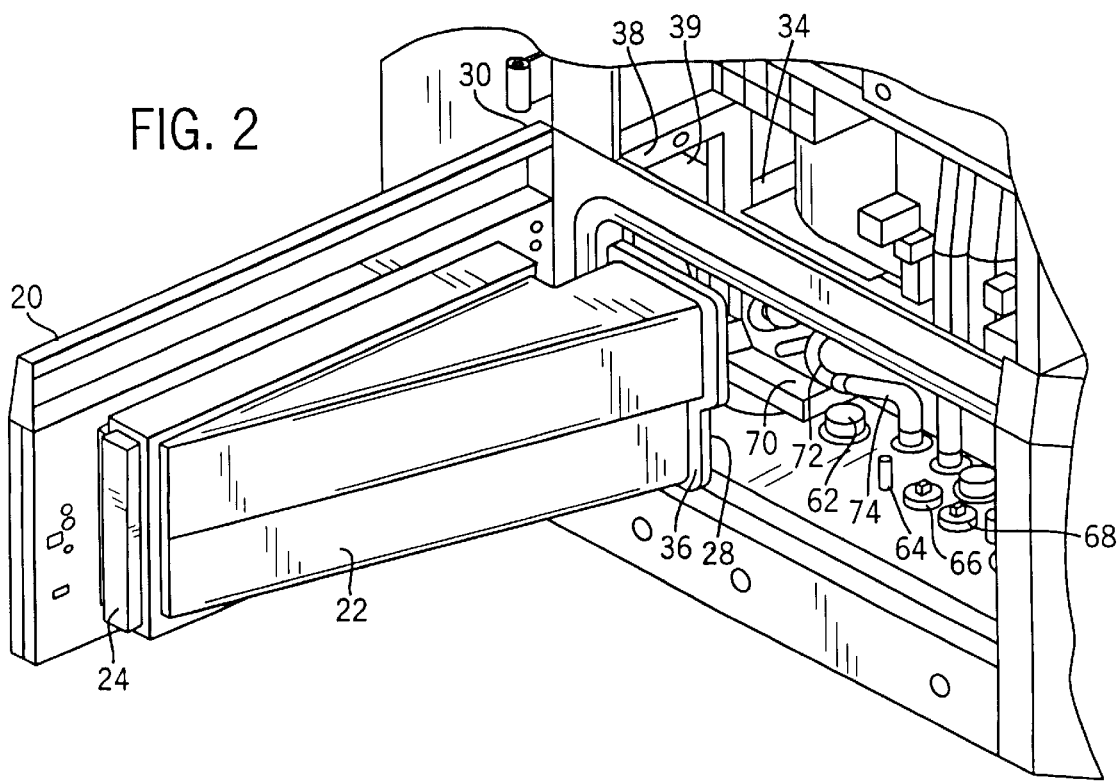
FIG. 2 is an enlarged perspective view of a portion of the air inlet system of the present invention as shown in FIG. 1.
Figure 4:
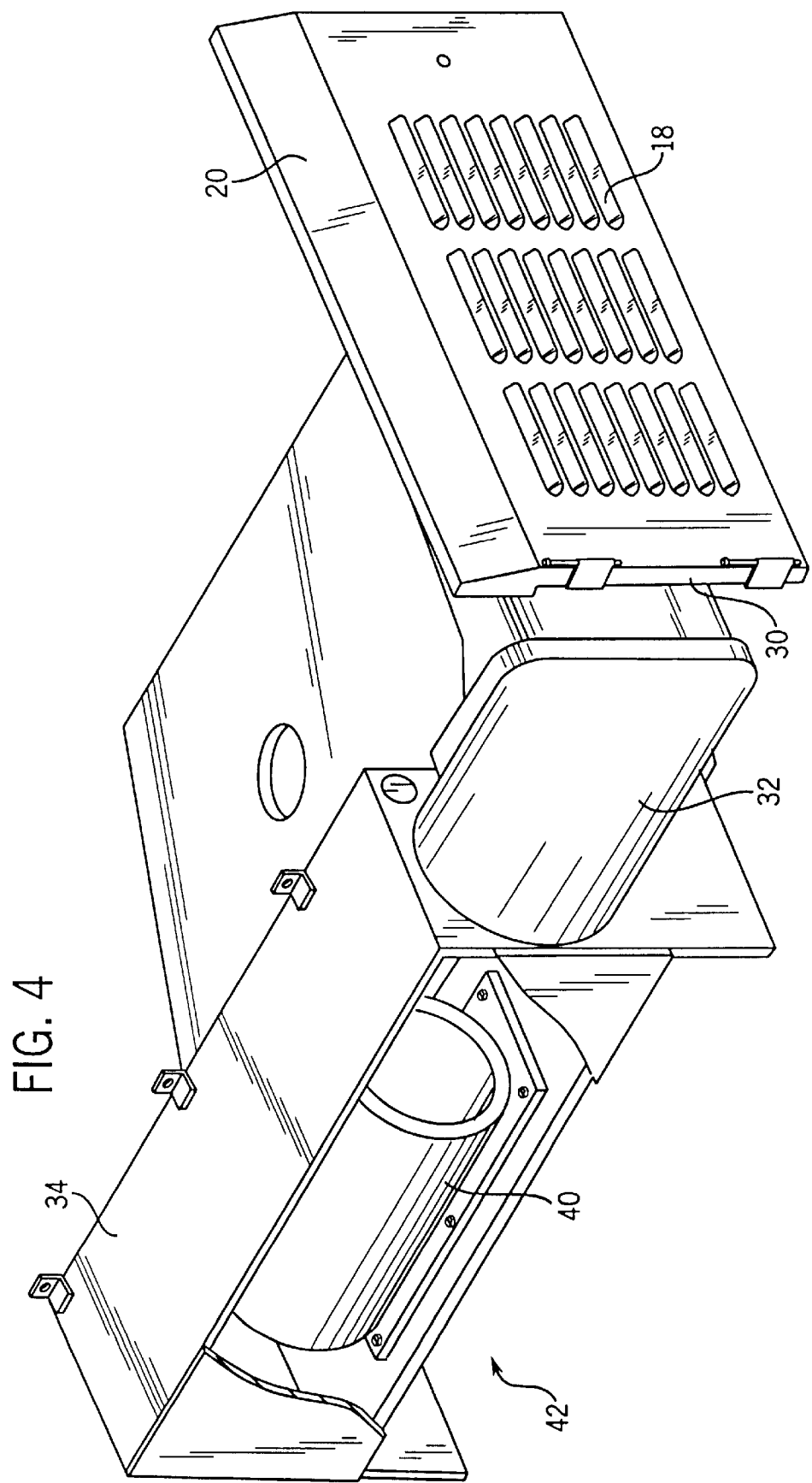
FIG. 4 is an enlarged perspective view of the air inlet system, showing its relationship to the blower of the air circulation system for the vehicle cab.

Outside air is provided to the air handling and conditioning system 16 through openings or louvers 18 in a door 20 as shown in FIG. 4. As shown in FIGS. 1 and 2, secured to the inside surface of the door 20 is a plenum 22 which receives the air which flows through the louvers 18. By way of example, door 20 may be fabricated from a metal such as steel or aluminum, or from a plastic depending upon the application. By way of further example, plenum 22 may be a rotational molded plastic part, and is secured to the door 20 by rivets, screws or other fastening arrangements such as integrally molded catches and clips.

Air which enters the plenum 22 passes through a filter 24 (e.g. foam filter, pleated paper filter, electrostatic, etc.) which is inserted into the plenum through rectangular opening 26. A suitable guide arrangement, such as channels formed on the top and bottom interior surfaces of the plenum 22, may be provided to hold the filter 24 in the preferred position within the plenum. To clean or exchange the filter 24, it is only necessary to open the door 20 and slide the filter 24 out of the plenum 22. Further, with the filter 24 in place, when the door 20 is shut, the exposed end of the filter 24 is located adjacent a wall of cab 10, such that no fastening devices are required to maintain the filter 24 in the desired position in the plenum 22. A discharge opening 28 is provided at the end of the plenum 22, adjacent the vertically hinged end 30 of the door 20. Fresh air flows through discharge opening 28 and is directed through an air conduit 32 to a blower housing 34, as shown in FIG. 3.

As shown in FIG. 1, the opening 28 in the plenum 22 is provided with a flange 36 which engages a resilient gasket 38 provided around an opening 39 in the conduit 32. Gasket 38 seals the connection between the plenum 22 and the conduit 32. Typically, the gasket 38 is formed from a foam plastic.

Figure 3:
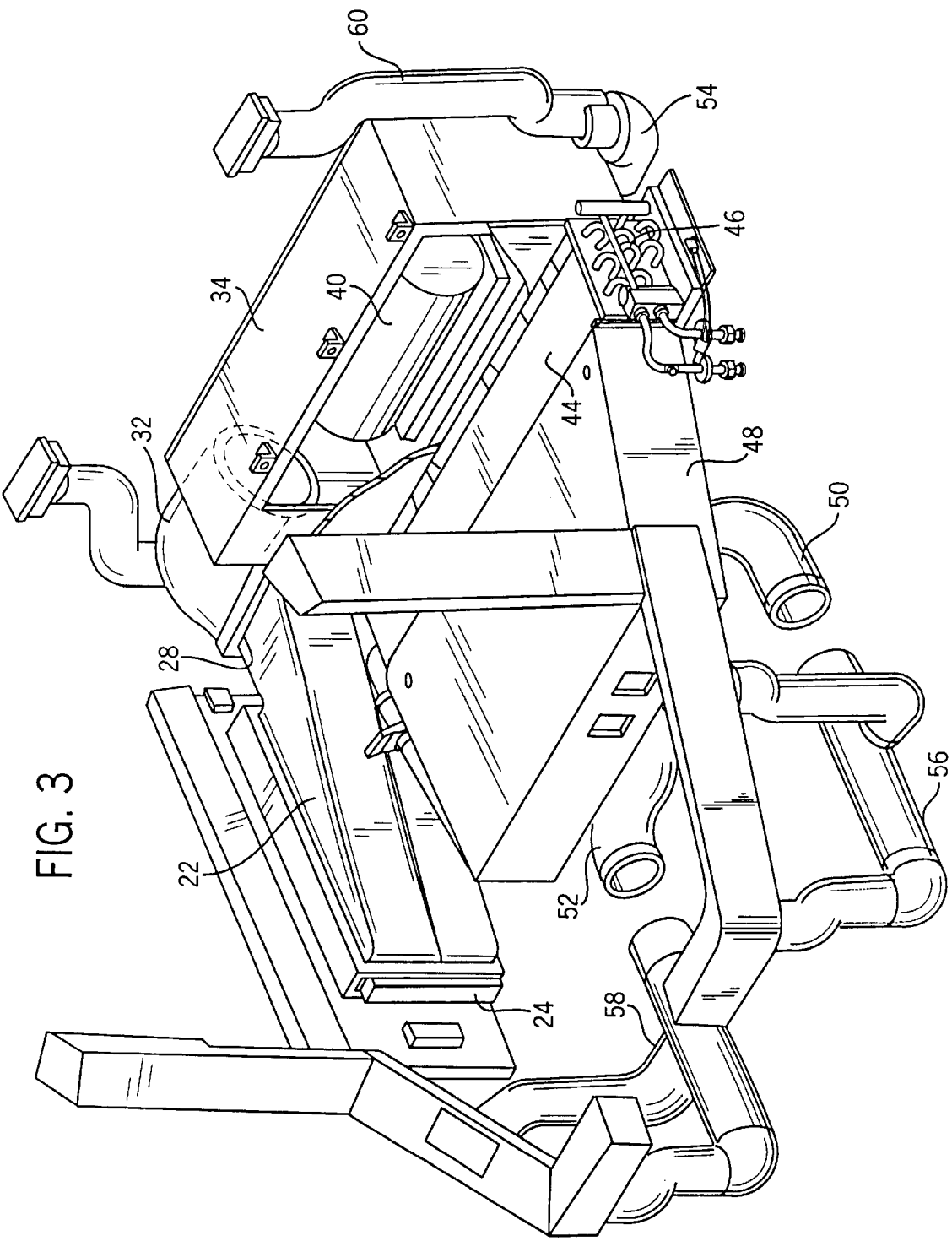
FIG. 3 is an enlarged perspective view of the air supply system for a vehicle cab, including the air inlet system of the present invention.

Referring to FIGS. 3 and 4, the blower housing 34 contains a blower unit 40, which receives air from the air conduit 32 and directs it to the confined space 42 under the blower 40. The air flows from the confined space 42 through a heat exchanger 44 containing cooling and heating coils 46. From the heat exchanger 44, the air flows to housing 48 for distribution of heat or cooling energy from the vehicle's heating/cooling systems. The air is then directed through conduits such as 50, 52, and 54, to air distribution arrangements (e.g. louvered vents) such as 56, 58, and 60 respectively, to the interior of the cab 10.

Referring again to FIGS. 1 and 2, in addition to providing access to filter unit 24 from the exterior of cab 10, door 20 provides ready access to various controls and components 62, 64, 66, 68, 70 and 72, which may include electrical fuses, relay panels, rocker switches and harness connections, a transmission controller, a heater shutoff valve, heater hose 74, and hydraulic pilot controllers and hoses.

While one embodiment of the invention has been shown, it should be apparent to those skilled in the art that what has been described is considered at present to be a preferred embodiment of the cab air inlet and service access arrangement of this invention. Accordingly, changes may be made in cab air inlet and service access arrangement without actually departing from the true spirit and scope of this invention. For example, plenum 22 may be pivoted on an axis generally parallel to the pivot axis of door 20, wherein plenum 22 includes a gasket which seals the inlet to plenum 22 with door 20 when door 20 is closed. In particular, when door 20 is closed, the inlets and outlets of plenum 22 would be forced against door 20 and conduit inlet 32. Furthermore, a system in accordance with the present invention can be used on vehicles used for road travel such as cars, trucks and buses. The appended claims are intended to cover all such changes and modifications which fall within the true spirit and scope of this invention.

What is claimed is:

1. An air inlet arrangement for supplying outside air to the air handling system of a vehicle cab comprising:

a door pivotally mounted on a vehicle cab to be moveable between open and closed positions, the door having an inside wall and further having a portion with openings formed therein to permit air from the exterior of the vehicle cab to flow through the openings;

a plenum secured to the inside wall in communication with the openings in the door;

an outlet opening formed in the plenum; and a duct supplying fresh air to the air handling system for the cab, the duct having an opening which receives air from the outlet opening when the door is in the closed position.

2. The air inlet arrangement for a vehicle cab as recited in claim 1, wherein a filter is received in the plenum for filtering air which passes through the openings in the door.

3. The air inlet arrangement for a vehicle cab as recited in claim 1, wherein a resilient gasket surrounds the outlet opening formed in the plenum and the opening in the duct to provide a seal between the outlet opening and the duct.

4. The air inlet arrangement for a vehicle cab as recited in claim 3, wherein a flange is provided on the plenum surrounding the outlet opening to engage the resilient gasket which is secured to the duct and surrounds the opening in the duct.

5. The air inlet arrangement for a vehicle cab as recited in claim 1, wherein the door is hinged at a first end, and the outlet opening in the plenum is located at the first end of the door.

6. The air inlet arrangement for a vehicle cab as recited in claim 5, wherein a resilient gasket surrounds the outlet opening in the plenum and the opening in the duct to provide a seal therebetween when the door is pivoted to the closed position.

7. The air inlet arrangement for a vehicle cab as recited in claim 1, wherein the plenum has an open end opposite the end in which the outlet opening is formed through which a filter may be inserted into the plenum when the door is open.

8. The air inlet arrangement for a vehicle cab as recited in claim 7, wherein when the door is in the closed position, the open end of the plenum is adjacent a wall formed in the cab.

9. The air inlet arrangement for a vehicle cab of claim 1, wherein opening the door provides access to electrical and mechanical components of the operating systems of the vehicle, which are located behind the door.

10. The air inlet arrangement for a vehicle cab as recited in claim 1, wherein the plenum is formed of plastic and is secured to the inside surface of the door by fasteners.

11. The air inlet arrangement for a vehicle cab of claim 1, wherein the openings in the door are formed as louvers.

12. The air inlet arrangement for a vehicle cab of claim 1, wherein the duct supplies fresh air to a blower chamber.

13. A vehicle cab comprising:

an air handling system;

a door pivotally mounted at the exterior of the cab and pivotable, between open and closed positions, the door having a wall with at least one opening formed therein;

a plenum including an inlet and an outlet, the plenum being secured to the door such that the opening is engaged with the inlet; and an air duct connected to the air handling system, the duct having a duct inlet which is engaged with the outlet of the plenum when the door is closed.

14. The arrangement of claim 13, wherein a filter is received in the plenum for filtering air which passes through the openings in the door.

15. The arrangement of claim 13, wherein a resilient gasket surrounds the plenum outlet and the duct inlet to provide a seal between the plenum outlet and the duct inlet.

16. The arrangement of claim 15, wherein a flange is provided on the plenum surrounding the outlet to engage the resilient gasket which is secured to the duct and surrounds the duct inlet.

17. The arrangement of claim 13, wherein the door is hinged at a first end, and the plenum outlet is located at the first end of the door.

18. The arrangement of claim 14, wherein the plenum has an open end opposite the end in which the outlet is formed through which a filter may be inserted into the plenum when the door is open.

19. The arrangement of claim 13, wherein the plenum is formed of plastic and is secured to the inside surface of the door by fasteners.

20. The arrangement of claim 13, wherein the opening in the door is formed as louvers.

* * * * *